UNITED STATES PATENT OFFICE.

RICHARD MORRIS, OF DONCASTER, COUNTY OF YORK, AND WILLIAM THOMAS GENT, OF MISTERTON, COUNTY OF NOTTINGHAM, ENGLAND.

PAINT.

SPECIFICATION forming part of Letters Patent No. 424,653, dated April 1, 1890.

Application filed March 26, 1889. Serial No. 304,853. (No specimens.) Patented in England January 16, 1889, No. 844.

*To all whom it may concern:*

Be it known that we, RICHARD MORRIS, engineer and chemical manufacturer, and WILLIAM THOMAS GENT, analytical chemist, subjects of the Queen of Great Britain and Ireland, and residing, respectively, at Beechfield, Doncaster, in the county of York, England, and Misterton, in the county of Nottingham, England, have invented a certain Improved Composition for Covering and Protecting Surfaces, (for which we have applied for a patent in Great Britain, No. 844, dated January 16, 1889,) of which the following is a specification.

The invention has for its object to provide a cheap and efficient composition capable of being readily applied to surfaces for protecting them.

According to our invention we combine resin, such as the resin of commerce, with a metallic oxide, such as oxide of zinc, and a drying material, such as sulphate of lime, plaster-of-paris, or gypsum. We may apply the composition in any suitable way—for instance, by liquefying it by heat or by using a solvent for the resin.

We will now state methods of carrying this invention into effect.

We take twenty parts, by weight, of commercial resin and reduce it to a fine powder. We also take seven parts, by weight, of oxide of zinc and seven parts, by weight, of gypsum, both in a state of fine powder. We thoroughly mix these powdered materials together, and the resulting composition may be sold in this state, to be afterward brought into a liquid form for use or to be fused in applying it. If it be desired to render the composition into a liquid form for sale, we add thereto a solvent for the resin, such as naphtha, in quantity in accordance with the desired consistency. A little boiled oil may also be added with advantage.

When the composition is to be fused on the surface, it may be placed thereon in the form of powder and then the surface be submitted to heat, when the composition liquefies and spreads evenly over the surface.

It will be understood that aniline or other coloring matters or pigments may be used to give any required color.

We claim as our invention—

The herein-described compound for covering and protecting surfaces, said compound consisting of about twenty parts resin and seven parts each of oxide of zinc and gypsum, all powdered and mixed together and adapted to be either fused by heat onto the surfaces to be protected or to be liquefied by a solvent, substantially as set forth.

In testimony whereof we have signed our names to this specification in the presence of two subscribing witnesses.

RICHARD MORRIS.
WILLIAM THOMAS GENT.

Witnesses:
JAMES HASTEE,
9 *Avenue Road, Doncaster, Merchant.*
FREDERICK WILLIAM DEIGHTON,
38 *Cartwright Street, Doncaster, Clerk to Messrs. Morris, Little & Son, Merchants, Doncaster.*